(12) United States Patent
Rozen et al.

(10) Patent No.: US 10,621,529 B2
(45) Date of Patent: Apr. 14, 2020

(54) GOAL-BASED TRAVEL RECONSTRUCTION

(71) Applicant: Conduent Business Services, LLC, Dallas, TX (US)

(72) Inventors: Joseph Rozen, Grenoble (FR); Julien Wuthrich, Clamart (FR); Frédéric Roulland, Le Versoud (FR)

(73) Assignee: Conduent Business Services LLC, Dallas, TX (US)

( * ) Notice: Subject to any disclaimer, the term of this patent is extended or adjusted under 35 U.S.C. 154(b) by 272 days.

(21) Appl. No.: 15/788,334

(22) Filed: Oct. 19, 2017

(65) Prior Publication Data
US 2019/0094030 A1    Mar. 28, 2019

(30) Foreign Application Priority Data

Sep. 22, 2017 (EP) .................................... 17306253
Sep. 22, 2017 (EP) .................................... 17306254

(51) Int. Cl.
| | |
|---|---|
| G06Q 10/06 | (2012.01) |
| G06Q 50/30 | (2012.01) |
| G06N 7/00 | (2006.01) |
| G06N 20/00 | (2019.01) |
| G01C 21/34 | (2006.01) |
| G06N 5/04 | (2006.01) |

(52) U.S. Cl.
CPC ..... *G06Q 10/06315* (2013.01); *G01C 21/343* (2013.01); *G06N 5/046* (2013.01); *G06N 7/005* (2013.01); *G06N 20/00* (2019.01); *G06Q 50/30* (2013.01)

(58) Field of Classification Search
CPC ............. G06Q 10/06315; G06Q 50/30; G01C 21/343; G06N 5/046; G06N 7/005; G06N 20/00
See application file for complete search history.

(56) References Cited

U.S. PATENT DOCUMENTS

2008/0038054 A1 *  2/2008  Gustafson ............... E01C 1/002
                                                              404/1
2009/0283591 A1   11/2009  Silbernagl
(Continued)

OTHER PUBLICATIONS

U.S. Appl. No. 15/151,773, filed May 11, 2016, Boris Chidlovskii.
(Continued)

*Primary Examiner* — Frederick M Brushaber
(74) *Attorney, Agent, or Firm* — Fay Sharpe LLP (57) ABSTRACT

A computer-implemented system and method for identifying passenger trips on a transportation network are described. The method includes acquiring transaction data for a collection of passengers boarding at stops on a transportation network. The network includes a plurality of routes. Route sequences are identified, based on the transaction data, each route sequence including at least two trip segments by a passenger. Each pair of trip segments of an identified route sequence are spaced by a transfer. For each identified route sequence, using a trip planner, the route sequence is classified as a multi-segment trip that includes at least one transfer or a multi-trip journey. A route sequence which is classified as a multi-trip journey is partitioned into at least two trips, each trip being a multi-segment trip or a single-segment trip.

16 Claims, 5 Drawing Sheets

(56) References Cited

U.S. PATENT DOCUMENTS

| | | |
|---|---|---|
| 2013/0185324 A1 | 7/2013 | Bouchard et al. |
| 2013/0317742 A1 | 11/2013 | Chidlovskii |
| 2013/0317747 A1 | 11/2013 | Chidlovskii et al. |
| 2013/0317884 A1* | 11/2013 | Chidlovskii .......... G06Q 10/063 705/7.31 |
| 2014/0089036 A1 | 3/2014 | Chidlovskii |
| 2014/0201066 A1 | 7/2014 | Roux et al. |
| 2014/0288982 A1 | 9/2014 | Chidlovskii |
| 2015/0186792 A1 | 7/2015 | Chidlovskii |
| 2015/0242944 A1* | 8/2015 | Willard .............. G06Q 30/0645 705/5 |
| 2016/0033283 A1 | 2/2016 | Ulloa Paredes |
| 2016/0123748 A1 | 5/2016 | Chidlovskii |
| 2016/0364645 A1 | 12/2016 | Ulloa Paredes et al. |
| 2017/0053209 A1 | 2/2017 | Ceret et al. |
| 2017/0109764 A1 | 4/2017 | Tripathi et al. |
| 2017/0132544 A1 | 5/2017 | Michel et al. |
| 2017/0169373 A1 | 6/2017 | Roulland et al. |
| 2017/0206201 A1 | 7/2017 | Chidlovskii |
| 2017/0206715 A1 | 7/2017 | Feuillette et al. |
| 2017/0357914 A1* | 12/2017 | Tulabandhula ........ G06Q 10/02 |
| 2018/0293521 A1* | 10/2018 | Akselrod ............... G06Q 50/30 |
| 2018/0308064 A1* | 10/2018 | Glaser ................ G06Q 10/1093 |
| 2019/0108468 A1* | 4/2019 | Nguyen ........... G06Q 10/06315 |

OTHER PUBLICATIONS

U.S. Appl. No. 15/788,130, filed Oct. 19, 2017, Sofia Zaourar Michel.

* cited by examiner

GOAL-BASED TRAVEL RECONSTRUCTION

This application claims the priority of EP Application EP17306254, filed Sep. 22, 2017, entitled GOAL-BASED TRAVEL RECONSTRUCTION, by Joseph Rozen, et al. and EP Application EP17306253, filed Sep. 22, 2017, entitled PREDICTION OF ACTUAL LOADS FROM FARE COLLECTION DATA, by Sofia Michel, et al., the disclosures of which are incorporated herein by reference in their entireties. Cross-reference is made to copending application Ser. No. 15/788,130, filed Oct. 19, 2017, entitled PREDICTION OF ACTUAL LOADS FROM FARE COLLECTION DATA, by Sofia Michel, et al., the disclosure of which is incorporated herein by reference in its entirety.

BACKGROUND

The exemplary embodiment relates generally to transportation planning and finds particular application in connection with a system and method for reconstructing traveler journeys which take into account inferred user goals to distinguish between multi-segment trips and separate trips.

Fare collection data from automatic ticketing validation (ATV) devices can be used to generate information about a transportation network in which vehicles, such as buses and trams, travel predefined routes at scheduled times. The information may be used to plan new routes or modify existing ones, modify schedules, or adjust pricing to meet various goals, such as improving community satisfaction, reducing costs, reducing traffic congestion, and the like.

In many transportation networks, users pay for trips with smart devices, such as smartcards or smartphone applications. Generally, a radio signal is established between the device and an ATV card reader, e.g., a radiofrequency identification (RFID) tag, to validate the trip. Prior to using the smart device, the user registers with the transportation network, allowing a transportation service provider to associate a charge for the journey with the user's account or to deduct the cost from a stored balance on the smartcard. The ATV device may provide various information for each validation, such as an identifier for the card, the time of the transaction, and the boarding stop or a GPS location, from which the boarding stop can be identified from the predefined route. This information may be collected by the ATV device and downloaded to a central server at the end of each day, or may be transmitted to the central server more frequently, e.g., by using the smartphones of the users as relay devices.

In many instances, users simply exit the vehicle at their chosen stop and no alighting location information is acquired. Additionally, users may make multi-segment trips, in which, in order to reach a destination, the user alights at one stop and boards another vehicle for the next or subsequent segment of the trip.

Systems have been developed to infer the alighting information and identify multi-segment trips using a variety of heuristics, such as:

1. When the smart card is used again within a predefined time period, the cardholder is assumed to be making a multi-segment trip and the alighting stop of the earlier trip is assumed to be the closest on the respective route to the next boarding stop;
2. Users return to their previous trip's destination stop for their next trip.
3. At the end of the day, users return to the first boarding stop of the same or the next day.
4. Alighting stops for travelers without smart cards, such as those using single journey tickets (including multi-trip tickets) follow a similar distribution to those using smart cards.

The next step is to detect the origins and destinations of users. This can be seen as the segmentation of the daily sequence of transport services used by a person into a set of trips motivated by a particular activity. Traditionally, this is performed using a time threshold that is either a maximum duration of a trip or a maximum duration of a transfer. Using this collected information, origin-destination (O-D) matrices can be generated, which, for each pair of stops on a scheduled route or in a transportation network, include a prediction of the number of travelers originating a trip at the first stop and having the second as the destination of their trip. The numbers may be averaged, e.g., over the course of a week, work week, or month.

One problem with this approach is that a multi-segment trip may be inferred when in fact, the user may be making two or more separate trips, i.e., the user has more than one destination. For example, a user may board a first bus at stop A, alight at stop B, board a second bus a few minutes later at stop C, after picking up a cup of coffee, and alight at stop D. The system may infer that the user is making a multi-segment trip, with A as the origin and D (inferred from other information) as the destination, when in fact, the user is making two trips, with destinations B and D, respectively. When a number of such incorrect assumptions is aggregated into an O-D matrix, this may lead to poor transportation planning.

INCORPORATION BY REFERENCE

The following references, the disclosures of which are incorporated herein in their entireties, by reference, are mentioned:

U.S. Pub. No. 20170206715, published Jul. 20, 2017, entitled LOCALIZATION OF TRANSACTION TAGS, by Remi Feuillette, et al.

U.S. Pub. No. 20170206201, published Jul. 20, 2017, entitled SMOOTHED DYNAMIC MODELING OF USER TRAVELING PREFERENCES IN A PUBLIC TRANSPORTATION SYSTEM, by Boris Chidlovskii.

U.S. Pub. No. 20170169373, published Jun. 15, 2017, entitled SYSTEM AND METHOD FOR MEASURING PERCEIVED IMPACT OF SCHEDULE DEVIATION IN PUBLIC TRANSPORT, by Frederic Roulland, et al.

U.S. Pub. No. 20170132544, published May 11, 2017, entitled METHOD AND SYSTEM FOR STOCHASTIC OPTIMIZATION OF PUBLIC TRANSPORT SCHEDULES, by Sofia Zaourar Michel, et al.

U.S. Pub. No. 20170109764, published Apr. 20, 2017, entitled SYSTEM AND METHOD FOR MOBILITY DEMAND MODELING USING GEOGRAPHICAL DATA, by Abhishek Tripathi, et al.

U.S. Pub. No. 20170053209, published Feb. 23, 2017, entitled SYSTEM AND METHOD FOR MULTI-FACTORED-BASED RANKING OF TRIPS, by Eric Ceret, et al.

U.S. Pub. No. 20160364645, published Dec. 15, 2016, entitled LEARNING MOBILITY USER CHOICE AND DEMAND MODELS FROM PUBLIC TRANSPORT FARE COLLECTION DATA, by Luis Rafael Ulloa Paredes, et al.

U.S. Pub. No. 20160123748, published May 5, 2016, entitled TRIP RERANKING FOR A JOURNEY PLANNER, by Boris Chidlovskii.

U.S. Pub. No. 20160033283, published Feb. 4, 2016, entitled EFFICIENT ROUTE PLANNING IN PUBLIC TRANSPORTATION NETWORKS, by Luis Rafael Ulloa Paredes.

U.S. Pub. No. 20150186792, published Jul. 2, 2015, entitled SYSTEM AND METHOD FOR MULTI-TASK LEARNING FOR PREDICTION OF DEMAND ON A SYSTEM, by Boris Chidlovskii.

U.S. Pub. No. 20140288982, published Sep. 25, 2014, entitled TEMPORAL SERIES ALIGNMENT FOR MATCHING REAL TRIPS TO SCHEDULES IN PUBLIC TRANSPORTATION SYSTEMS, by Boris Chidlovskii.

U.S. Pub. No. 20140201066, published Jul. 17, 2014, entitled SYSTEM AND METHOD FOR ENABLING TRANSACTIONS ON AN ASSOCIATED NETWORK, by Pascal Roux, et al.

U.S. Pub. No. 20140089036, published Mar. 27, 2014 DYNAMIC CITY ZONING FOR UNDERSTANDING PASSENGER TRAVEL DEMAND, by Boris Chidlovskii.

U.S. Pub. No. 20130317884, published Nov. 28, 2013, entitled SYSTEM AND METHOD FOR ESTIMATING A DYNAMIC ORIGIN-DESTINATION MATRIX, by Boris Chidlovskii.

U.S. Pub. No. 20130317747, published Nov. 28, 2013, entitled SYSTEM AND METHOD FOR TRIP PLAN CROWDSOURCING USING AUTOMATIC FARE COLLECTION DATA, by Boris Chidlovskii, et al.

U.S. Pub. No. 20130317742, published Nov. 28, 2013, entitled SYSTEM AND METHOD FOR ESTIMATING ORIGINS AND DESTINATIONS FROM IDENTIFIED END-POINT TIME-LOCATION STAMPS, by Boris Chidlovskii.

U.S. Pub. No. 20130185324, published Jul. 18, 2013, entitled LOCATION-TYPE TAGGING USING COLLECTED TRAVELER DATA, by Guillaume M. Bouchard, et al.

U.S. Pub. No. 20090283591, published Nov. 19, 2009, entitled PUBLIC TRANSIT SYSTEM FARE PROCESSOR FOR TRANSFERS, by Martin Silbernagl.

U.S. application Ser. No. 15/151,773, filed May 11, 2016, entitled TRAVEL DEMAND INFERENCE FOR PUBLIC TRANSPORTATION SIMULATION, by Boris Chidlovskii.

BRIEF DESCRIPTION

In accordance with one aspect of the exemplary embodiment, a method for identifying passenger trips on a transportation network is provided. The method includes acquiring transaction data for a collection of passengers boarding at stops on a transportation network, the transportation network comprising a plurality of routes. Route sequences are identified, based on the transaction data, each route sequence including a sequence of at least two trip segments by a passenger. Each sequential pair of trip segments of an identified route sequence is spaced by a transfer. For an identified route sequence, using a trip planner, the route sequence is classified as a multi-segment trip, which includes at least one transfer, or a multi-trip journey. When the route sequence is classified as a multi-trip journey, the method includes partitioning the multi-trip journey into at least two trips, each of the at least two trips being one of a multi-segment trip and a single-segment trip.

One or more of the steps of the method may be performed with a processor.

In accordance with another aspect of the exemplary embodiment, a system for identifying passenger trips on a transportation network includes a trip planner which generates at least one candidate itinerary for a journey between an origin and a destination on the transportation network. A route sequence identifier receives transaction data acquired for a collection of passengers boarding at stops on a transportation network and identifies route sequences based on the transaction data. Each route sequence includes a sequence of at least two trip segments by a respective passenger. Each pair of sequential trip segments in the route sequence is spaced by a transfer. A route sequence decomposer, for an identified route sequence, using the trip planner, classifies the route sequence as one of: a multi-segment trip comprising at least one transfer, which is among a set of candidate itineraries output by the trip planner for an origin and destination of the route sequence, and a multi-trip journey, which is not among the set of candidate itineraries output by the trip planner for the origin and destination of the route sequence. When the route sequence is classified as a multi-trip journey, the multi-trip journey is partitioned into at least two trips, each of the at least two trips being one of a multi-segment trip and a single-segment trip. A processor implements the route sequence identifier and route sequence decomposer.

In accordance with another aspect of the exemplary embodiment, a method for generating origin-destination data for a collection of passenger trips on a transportation network. The method includes acquiring transaction data for a collection of passengers boarding at stops on a transportation network. The transportation network includes a plurality of routes. Route sequences are identified, based on the transaction data. Each route sequence includes a sequence of at least two trip segments by a passenger and at least one transfer. For an identified route sequence, the method includes using a trip planner to identify a set of candidate itineraries between an origin and a destination of the route sequence. The route sequence is classified as one of: a multi-segment trip comprising at least one transfer, when the route sequence is among the set of candidate itineraries output by the trip planner between the origin and destination of the route sequence, and a multi-trip journey, when the route sequence is not among the set of candidate itineraries output by the trip planner between the origin and destination of the route sequence. When the route sequence is classified as a multi-trip journey, the method includes partitioning the multi-trip journey into at least two trips, each of the at least two trips being one of a multi-segment trip and a single-segment trip, and generating origin-destination data based on the identified multi-segment and single-segment trips.

At least one of the steps of the method may be performed with a processor.

DETAILED DESCRIPTION

Aspects of the exemplary embodiment relate to a system and method for determining origins and destinations of travelers on a transportation network which distinguishes between a multi-segment trip, having an origin and destination and one or more transfers between them, and a sequence of two or more separate trips, having the same final destination. It can be seen as the segmentation of the daily sequence of transport services used by a person into a set of trips, each motivated by a particular activity. Traditionally segmentation is performed using a time threshold that establishes either the maximum duration of a trip or the maximum duration of a transfer. In practice, however, by providing a sufficient threshold to encompass long journeys and/or transfers in multi-segment trips, some of the sequences of two or more trips are incorrectly identified as segments of a multi-segment trip.

Figure 1:
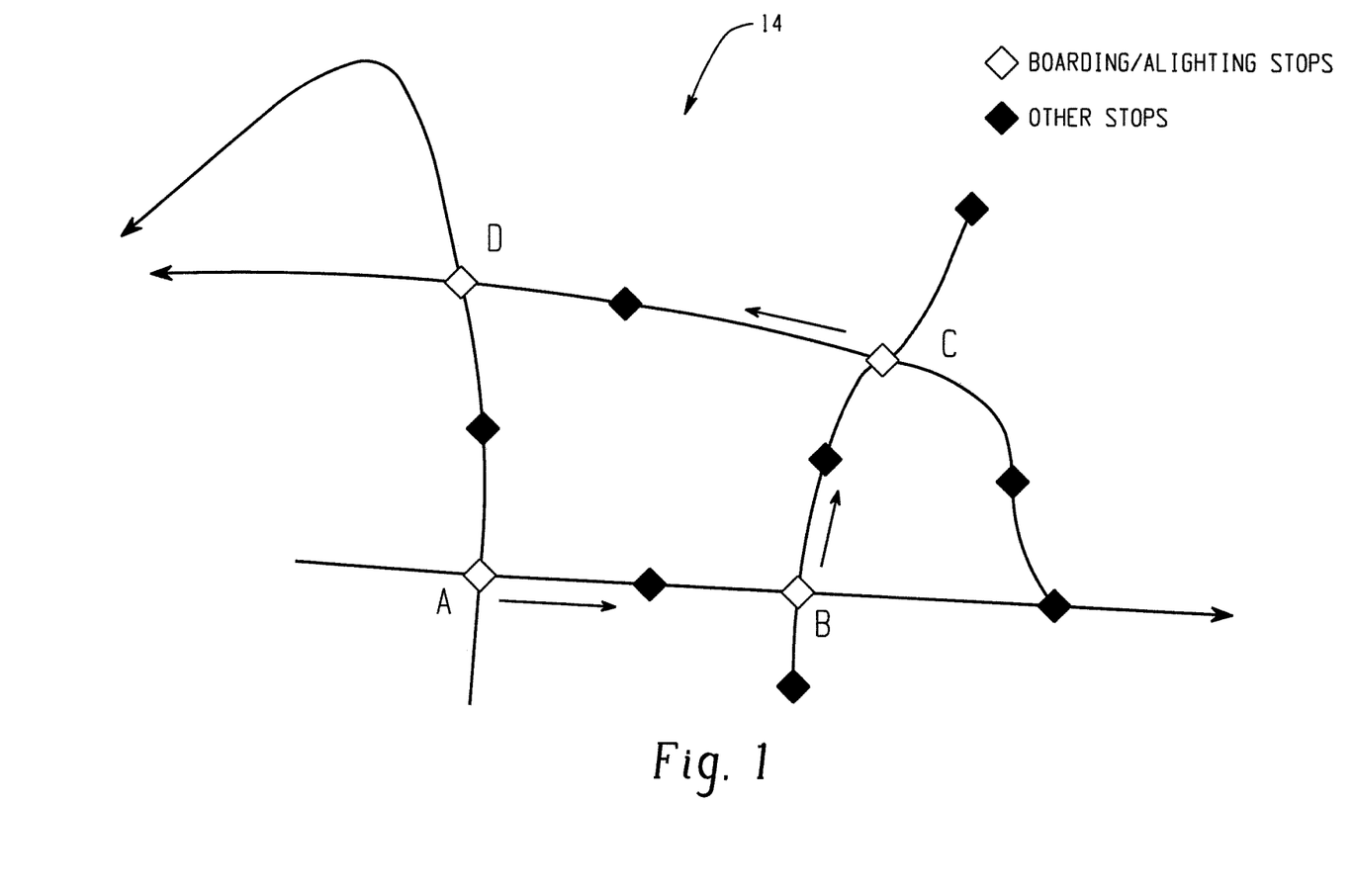
FIG. 1 is a schematic view of a traveler's trips on a transportation network.

FIG. 1 illustrates travel by a user which illustrates the problem of distinguishing multi-segment trips from multi-goal journeys composed of a sequence of two or more trips. Assuming that the transfer times are within the threshold, it could be inferred that the traveler boarded at A, then transferred at B, transferred again at C and alighted at destination D. Although this was achieved within a reasonable time, this route with two transfers represents a long detour with respect to choosing the direct line between A and D. In the present system and method, such patterns are considered as being motivated by one or more intermediate goals along the route and therefore that the travel from A to B should be split into two or more trips, each with a separate origin and destination.

The exemplary system and method can be used to improve the reconstruction of passenger trips from fare collection data, which in turn, can be used for origin-destination analysis and in the generation of demand models for simulation of modifications to the transportation network, such as adding/removing routes, scheduled frequency or timing along routes, ticket pricing, and so forth.

Experiments performed on data for several cities indicate the usefulness of the approach, particularly where users tend to make more frequent transfers where they are potentially addressing several objectives.

Figure 2:
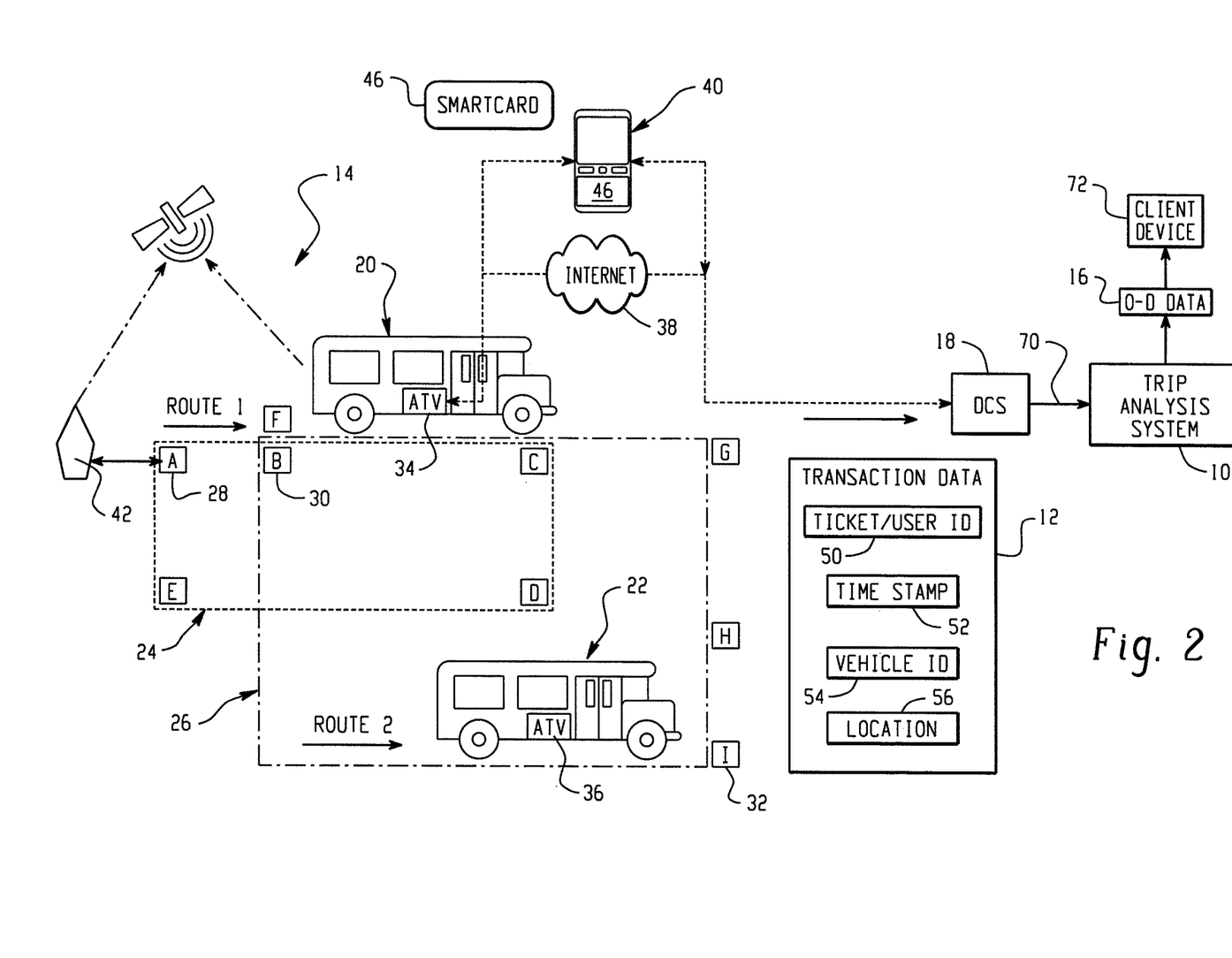
FIG. 2 is a functional block diagram of an environment in which a trip analysis system for determining origins and destinations of travelers on a transportation network in accordance with one aspect of the exemplary embodiment.
Figure 3:
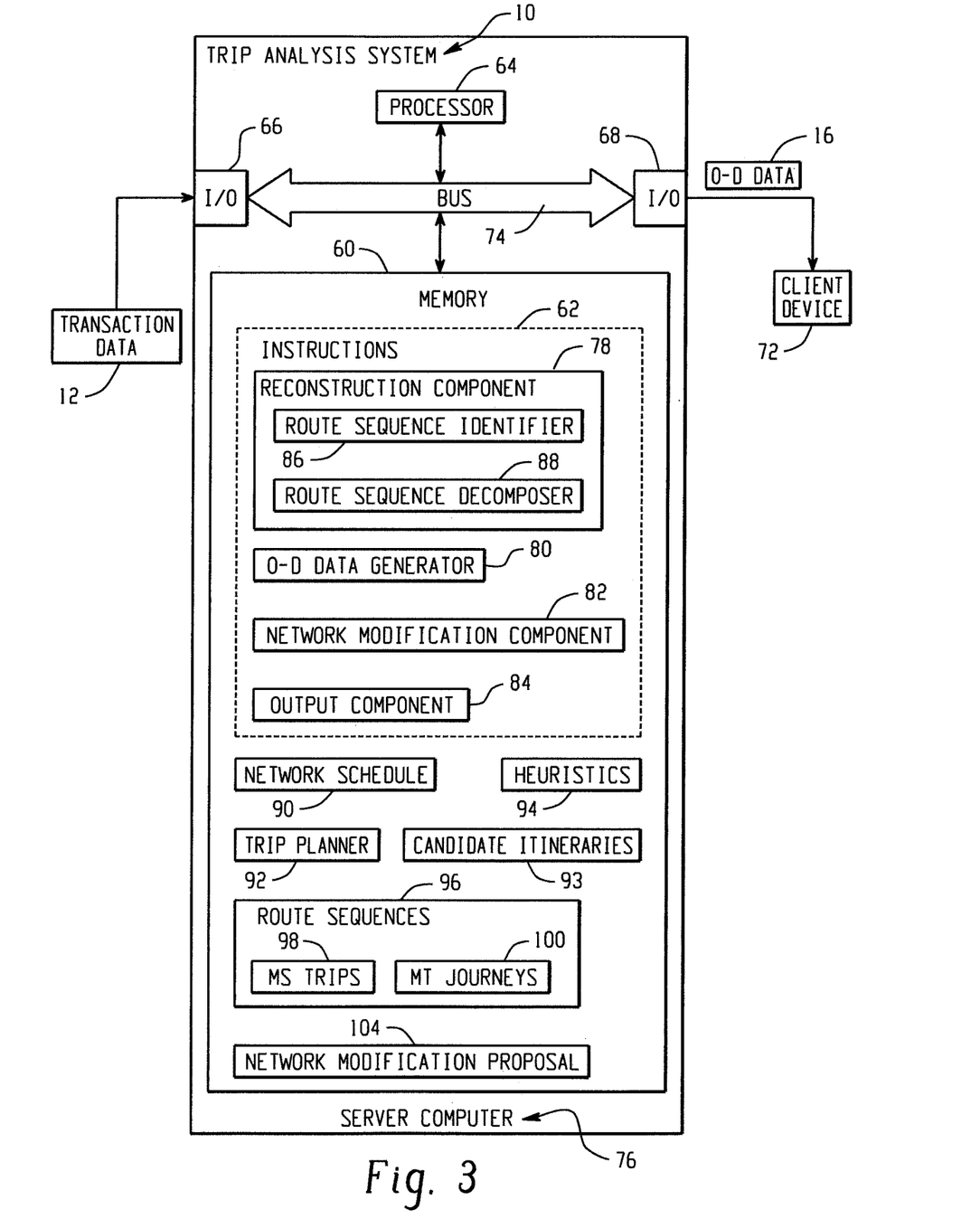
FIG. 3 is a functional block diagram of a trip analysis system for determining origins and destinations of travelers on a transportation network in accordance with another aspect of the exemplary embodiment.

With reference to FIGS. 2 and 3, a trip analysis system 10 analyzes transaction data 12, received, directly or indirectly, from an associated transportation network 14. In the transportation network, vehicles, such as buses and trams, travel predefined routes at scheduled times. Passengers (users) of the transportation network make journeys on the transportation network, which, in some cases, include transfers. In a transfer, the passenger alights at one stop on the network and boards at the same or another stop on the network. Transfers may occur between different routes of the network 14, or, in some cases, such as loops, between two stops on the same network, or even at the same stop on a later scheduled route.

The system 10 generates origin-destination data 16 concerning the users of the transportation network 14, or information based thereon. The data 12 may be received by the system 10 from an intermediate data collection server (DCS) 18, which collects the data from various parts of the network and may process the data, for example, in order to collect fares for trips made by users of the network 14.

The transportation network 14 can be as described, for example, in one or more of above-mentioned US Pub. Nos. 20170206715, 20170206201, 20170169373, 20170132544, 20170109764, 20170053209, 20160364645, 20160123748, 20160033283, 20140288982, 20140201066, 20140089036, 20130317884, 20130317747, 20130317742, 20130185324, and U.S. Ser. No. 15/151,773.

By way of example, the transportation network 14 includes multiple public transport vehicles 20, 22, etc., such as buses or trams. The vehicles travel on different routes 24, 26, etc. of the network 14, according to predefined schedules, to provide transportation services that are utilized by a large number of users, which may be referred to as passengers or travelers. Each route may include a set of predetermined stops 28, 30, 32, etc. (such as bus stops or tram stops), at fixed locations on the route, where passengers can board or alight from a vehicle. Data collection units, such as automatic ticketing validation (ATV) devices 34, 36 onboard the vehicles or at fixed locations at or near the stops, collect transaction data 12, which is sent to the data collection server 18 and/or the trip analysis system 10, for processing. In the present system and method, the transaction data 12 is used to predict the origins and destinations of travelers on the route. Each vehicle 20, 22 may have one or more such ATV devices 34, 36 mounted in the passenger area of the vehicle or by the door where passengers enter or leave the vehicle. In some embodiments, ATV devices 34, 36 may be at fixed locations at or near the stops. In some embodiments, such as on rail or subway networks, the ATV devices 34, 36 may be associated with turnstiles leading to the train/subway platform.

The automatic ticketing validation (ATV) devices 34, 36 may supply the transaction data 12 by wired or wireless connection to the DCS 18 and/or system 10. Various methods of transferring the data 12 are contemplated, such as via a wide area network, such as the internet 38, by using users' smart devices 40 as relay devices (see, for example, U.S. Pub. No. 20140201066), via a local area network or direct connection when the vehicle has returned to its base location, or via short range communication when the vehicle is within range of a fixed communication device 42, which may be positioned at or near one or more of the stops 28, 30, 32, etc. As will be appreciated, the system and method are not limited to the method(s) used to collect the data 12 and more than one method may be used.

In one embodiment, at least some users of the transportation network preregister with the DCS 18, or other registration system, which allows a unique identifier (user ID) 50 to be associated with each of these users. The user is issued with an electronic ticket 46, which allows the user to take trips on the network and to pay for the trips, e.g., by deduction of a respective amount from a stored value on the card or by billing the user's credit card. Some users of the network may use a stored value ticket 46, which allows a user to add value anonymously to the ticket. The ticket 46 may have a unique ID 50 which is inferred to be associated with trips made by the ticket holder and can be treated in the same manner as a User ID for analysis purposes.

As illustrated in FIG. 2, the electronic ticket 46 may be a card e.g., with an RFID tag, or in the form of a software application on a user's smart phone 40 that is equipped with a short range communication device. When the user swipes the ATV device 34, 36 with the electronic ticket 46 or smart phone 40, the ATV device determines whether the ticket is valid for travel and, if validated, generates transaction data 12 for a transaction. The transaction data 12 may include some or all of: the user's/ticket ID 50, a time stamp 52, a vehicle ID 54, which may be stored in the ATV device, and a vehicle location 56. The user ID is retrieved from the electronic ticket or smart phone when within communication range. The time stamp 52 may be generated by a clock associated with the ATV device or onboard the vehicle. The clock may be optionally updated by time signals from a fixed beacon 42, positioned along the scheduled route, e.g., at some or all of the stops. The vehicle location 56 may be generated by an Automated Vehicle Location (AVL) device onboard the vehicle, or by a fixed device, such as an ATV device 34, 36 positioned at or near the stop, or a fixed beacon 42. In one embodiment, the beacon transmits time signals and/or its location to the vehicle, when within communication range, e.g., by near field communication. Such a system is described, for example, in U.S. Pub. No. 20170206715. From the transaction information, the system 10 identifies the origin of the user's trip and predicts a destination for the trip, taking account other trips/trip segments made by the same user (as identified by the user ID) and a set of heuristics.

Some users of the network may use prepaid single use tickets which allow them to make a single trip (which can be a multi-segment trip), sometimes within a specified time period. In this case, the transaction data 12 lacks a user ID. However, multiple uses of the ticket, if these are permitted, may be assumed to be by the same person.

The automatic ticketing validation (ATV) device 34, 36 may include an RFID (Radio-frequency identification) transaction tag that collects transaction data for travelers, such as the user/ticket ID 50 and/or a validation certificate.

With particular reference to FIG. 3, the trip analysis system 10 includes memory 60, which stores instructions 62 for performing the exemplary method and a processor 64, in communication with the memory, for executing the instructions. In particular, the processor 64 executes instructions for performing the method outlined in FIG. 3. The processor may also control the overall operation of the computer system 10 by execution of processing instructions which are stored in memory 60. Computer system 10 also includes one or more of input/output interface(s) 66, 68 for communicating with external devices, such as DCS 18, e.g., via a link 70, such as a wired or wireless network, such as the Internet. The input/output interface 68 may output the O-D data 16, or information based thereon, to a client device 72. The client device may include one or more of a computer incorporating memory and a processor, a display device for displaying information to users, and a user input device for inputting text and/or for communicating user input information and command selections to the processor, which may include one or more of a keyboard, keypad, touch screen, writable screen, and a cursor control device, such as mouse, trackball, or the like. The various hardware components 60, 64, 66, 68 of the system 10 may be all connected by a bus 74. The system 10 may be hosted by one or more computing devices, such as the illustrated server computer 76.

The computer system 10 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 60 may represent any type of non-transitory computer readable medium such as random access memory (RAM), read only memory (ROM), magnetic disk or tape, optical disk, flash memory, or holographic memory. In one embodiment, the memory 60 comprises a combination of random access memory and read only memory. In some embodiments, the processor 64 and memory 60 may be combined in a single chip. The input/output (I/O) interface 66, 68 allow the computer to communicate with other devices via a computer network, such as a local area network (LAN) or wide area network (WAN), or the internet, and may comprise a modulator/demodulator (MODEM) a router, a cable, and and/or Ethernet port. Memory 60 stores instructions for performing the exemplary method as well as the processed data, such as origin-destination data 16.

The digital processor 64 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The software instructions 62 may include various components for implementing parts of the method. Some or all of the software components may be wholly or partly resident on the client device 72 and/or DCS 18. In one embodiment, the instructions 62 include a reconstruction component 78, an O-D data generator 80, a network modification component 82, and an output component 84.

The reconstruction component includes a route sequence identifier 86 and a route sequence decomposer 88.

The system has access to transportation network schedule(s) (TNS) 90, which store(s) information on the routes serviced by the transportation network, the locations of stops along each route, and the planned arrival time at each stop on each scheduled route itinerary. The system also has access to a public transport trip planner 92. The trip planner 92, or journey planner, provides information about available public transport journeys or routes along the public transportation system, for example via a Web-based application. Such an application is designed to prompt a prospective traveler to input an origin and a destination, and then use a trip planning engine to determine at least one candidate itinerary 93 for a journey between the two input locations using specified available public transportation services and routes, e.g., buses, trams, trains, etc., depending on available schedules for these services. Each candidate itinerary includes the scheduled alighting time and stop for each segment of the trip, and instructions for transferring between routes, where applicable. In identifying the candidate itineraries, the trip planner 92 may find one or more suggested paths between an origin and a destination, which satisfy different criteria. The origin and destination may be specified as geospatial coordinates or names of points of access to public transport such as bus stops, stations, etc. A location finding process may resolve the origin and destination into the nearest known nodes on the transport network in order to compute a trip plan over its data set of known paths, i.e., routes. Trip planners for large networks may use a search algorithm to search a graph of nodes (representing access points to the transport network) and edges (representing possible journeys between points). Different weightings such as distance, cost or accessibility may be associated with each edge. U.S. Pat. No. 9,404,760 describes one example trip planner which may be used herein. Another example trip planner which may be used is described in U.S. Pub. No. 20170206201, which takes into account the time of day and traveler preferences in ranking trip plans. By placing different weights on different criteria used in generating trip plans, such as number of transfers, walking distance, total travel time, transfer time between segments of the journey, total cost of the journey, and combinations thereof, the trip planner 92 is able to provide more than one candidate itinerary 93 for a given origin and destination, starting at a given time, that would each meet traveler preferences for at least some travelers on the network.

The route sequence identifier 86 of the reconstruction component 78 uses the schedule(s) 90, trip planner 92 and a set of heuristics 94 to identify origins and destinations of traveler trips on the transportation network. In general, boardings are available directly from Fare Collection (FC) data, such as the illustrative transaction data 12, or information generated therefrom, as check-ins for boarding are usually required. Alightings, however, usually have to be inferred from subsequent validations for travelers, or tracked by anonymized ticket numbers, during a day of operations. One object of the heuristics 94 is to identify whether a boarding corresponds to an origin of a possibly multi-segment trip, and to identify, for each trip, a respective origin and destination.

Example heuristics 94 may include some or all of:

1. Passengers return to their previous trip's destination stop for their next trip, or to the nearest stop on the next route, i.e., users alight at the closest stop from the next boarding stop in their day's history.

2. Passengers generally have a symmetric use of the network, i.e., the first boarding of the day is the final destination of the same day (or the previous day), assuming this is possible, given the route selected for the last boarding. A day may be defined as a 24 hour period starting at midnight, or at some other predefined time.

3. Alighting stops for passengers using tickets that are not valid for the entire day follow a similar distribution to those using tickets that are valid for the entire day. These may include those using single journey tickets (including multi-trip tickets) rather than electronic tickets 46.

4. When an electronic ticket 46 is used again within a predefined time threshold of the earlier boarding (or when the inferred total journey time is within a predefined threshold), the passenger is inferred to be making a route sequence 96, which is to be further processed for being identified either as a multi-segment (MS) trip 98, composed of a sequence of two or more trip segments, or as a multi-trip (MT) journey 100, composed of a sequence of trips with different goals.

Once a route sequence 96 is identified, which includes a temporal split (or splits) between two (or more) alightings and boardings, the route sequence decomposer 88 of the reconstruction component 78 applies additional heuristics 94 and the trip planner 92 to distinguish coherent itineraries with transfers imposed by the structure of the network (multi-segment (MS) trips 98) from those with transfers that are predicted to be motivated by a traveler goal (multi-trip (MT) journeys 100).

The origin and destination of each identified trip is aggregated and stored by the O-D data generator 80 in a suitable data structure 16, such as an O-D matrix. The matrix may include, for each pair of stops on the network 14, or for at least some pairs, the number of passengers having the first of the pair of stops as their origin and the second of the pair as their destination. The O-D data may include data for passengers making multi-segment trips (at least one transfer) and also those making single-segment trips (no transfers).

The optional network modification component 82 may propose one or more modifications 104 to the network, based on the O-D data.

The output component 84 outputs the O-D-data 16, or information based thereon, such as modifications proposed by the network modification component 82.

Figure 4:
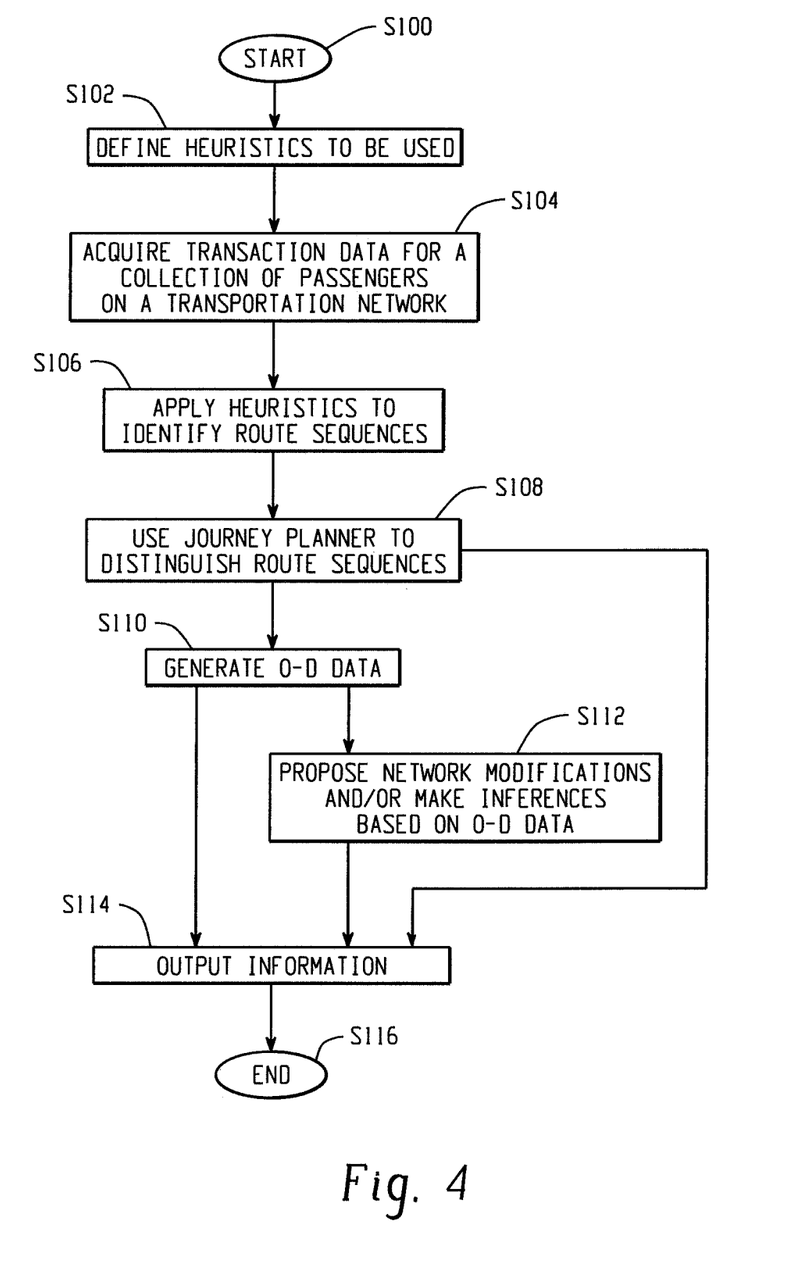
FIG. 4 is a flow chart illustrating a method for determining origins and destinations of travelers on a transportation network in accordance with another aspect of the exemplary embodiment.

FIG. 4 provides an overview of the method, which can be performed with the system of FIG. 3. The method starts at S100.

At S102, if not already done, heuristics 94 are defined and stored as a sequence of instructions, for predicting at least some of the unknown information from the transaction data 12, given the network schedule 90 and/or other information available to the system 10. These include heuristics 94 for using the trip planner 92 to distinguish between MS trips and MT journeys.

At S104, transaction data 12 is acquired for a collection of passengers on the transportation network 14. The data may cover any suitable time period, such as a day, week, month, or the like. The data may include boarding information for at least 1000, or at least 10,000, or at least 100,000 passenger trips made on the network.

At S106, the heuristics 94 are applied to the transaction data to identify route sequences as well as single segment trips. Each identified route sequence includes at least two trip segments in sequence, each sequential pair of trip segments being spaced by a transfer between routes by a passenger. The identification of route sequences may include applying some or all of the four heuristics defined above. Additional and/or different heuristics may be used, depending, in part, on the type of information available from the transportation network. Assuming that route sequences are identified from the transaction data 12, the method proceeds to S108, otherwise directly to S110.

At S108, for each identified route sequence 96, the journey planner 92 is used to determine whether an MT journey 100 or an MS trip 98 is the most probable, and the route sequence is labeled accordingly. Where the route sequence is classified as a multi-trip journey 100, it is partitioned into at least two trips, each with a respective origin and destination. Each of the at least two trips is either a multi-segment trip or a single-segment trip. The partitioning of an MT journey 100 may include recursively decomposing the MT journey 100 into one or more shorter route sequences and, if appropriate, one or more of these shorter route sequences can be further analyzed and partitioned into trips until no MT journeys 100 remain to be processed.

At S110, origin-destination data 16 is generated using the identified origins and destinations for trips identified at S106 and S108, by the O-D data generator 80. The data may be aggregated over any suitable time period(s), such as one or more hours, a day, week, or the like. In one embodiment, the aggregation of the data may include generating an origin-destination matrix which includes, for each pair of stops represented in the matrix as an origin and destination respectively, the number of passengers predicted to have made such a trip during the selected time period.

At S112, the generated O-D data may be used to propose network modifications 96, for example, to add/remove routes, increase/decrease the number of scheduled vehicles on the routes, change stop times, adjust fare prices, and the like. The data can also be used to identify points of interest.

For example, if a significant number of passengers use the MT route A-B-C-D in FIG. 1, it may be inferred that a point of interest exists at B or C and a map consulted to find likely candidate points of interest. This may be influenced by the time of day, since some potential points of interest can be ignored if they are not open, or largely unused at the relevant times.

At S114, information is output, by the output component 84, such as the trips identified at the S108, the O-D data generated at S110, or information based thereon, such as proposed modifications to the network, or the like.

The method ends at S116.

Figure 5:
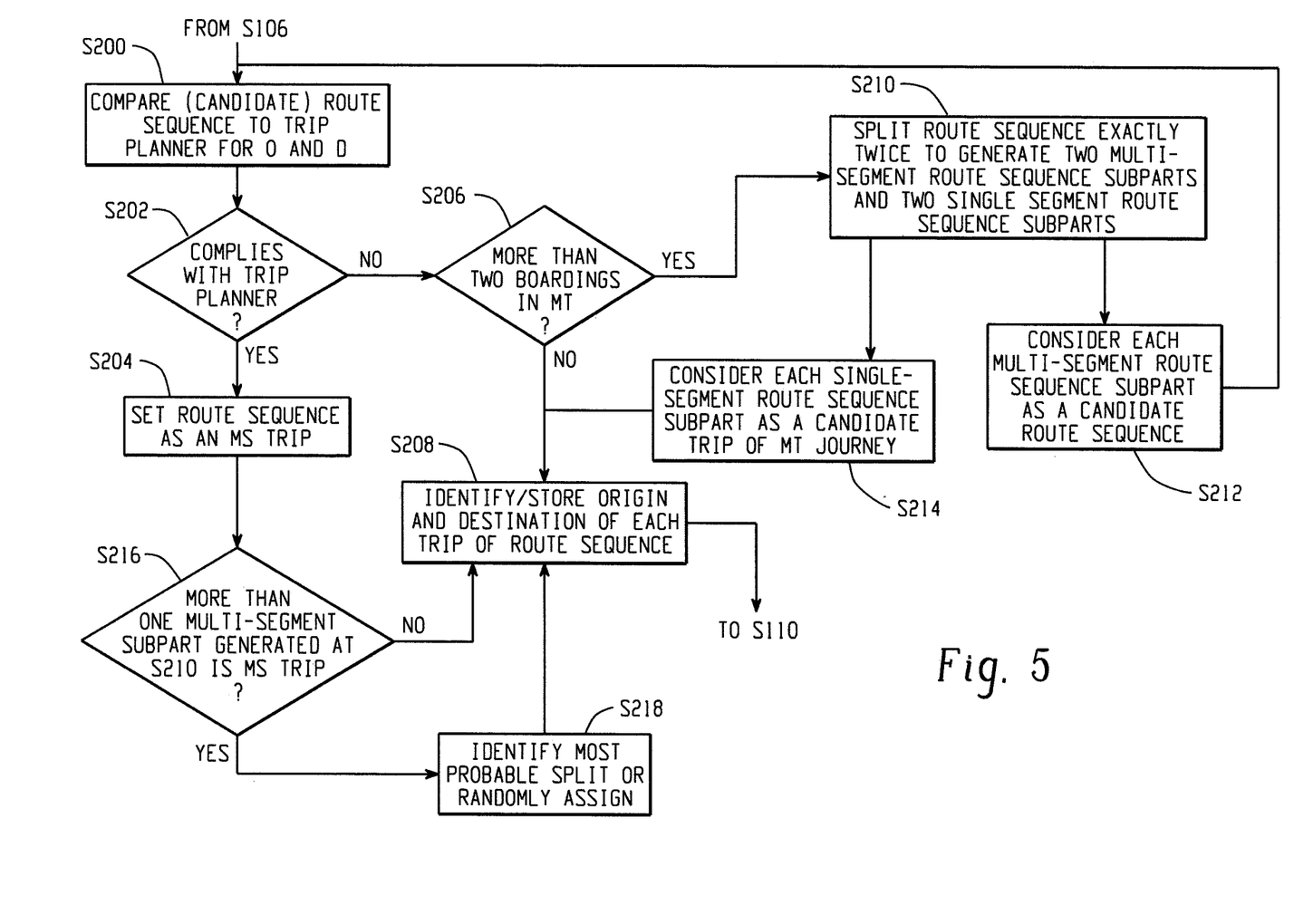
FIG. 5 is a flow chart illustrating a part of the method of FIG. 4.

In S108, the method includes processing the identified route sequences 96 to identify those that should be classed as multi-trip (MT) route sequences composed of at least two trips. Since some of these may be composed of more than two trips, a recursive process may be used, as follows. This step of the method may proceed as shown in FIG. 5.

At S200, for each observed route sequence 96 generated from a temporal split and with more than one trip segment (boarding and alighting), the trip planner 92 is used between the origin and destination of the route sequence 96 and a set of candidate itineraries is identified. The set of candidate itineraries may be empty or, more generally, may include one or more candidate itineraries. As will be appreciated, if the passenger follows a route sequence from A to B and then B to A, the origin and destination of the route sequence, A, is the same, and thus it is not necessary to access the trip planner 92, since it will likely not output an itinerary, and/or the route sequence can be automatically classified as a multi-trip journey.

If at S202, the route sequence 96 chosen by the traveler is within the trip planner results (i.e., complies with one of the candidate itineraries output by the trip planner 92), then at S204, the route sequence 96 is inferred to be an MS trip 98, whose origin is the first boarding of the route sequence an destination is the last alighting of the route sequence.

If at S202, the route sequence 96 chosen by the traveler is not within the trip planner results, then the route sequence is considered to be a multi-trip (MT) route sequence and the method proceeds to S206.

If at S206, the route sequence 96 has only one transfer (i.e., exactly two observed boardings), then at S208, this transfer is considered as a destination of a first trip and the origin of a second trip.

If at S206, the route sequence 96 has more than one transfer (i.e., three or more observed boardings), then at S210, the route sequence is split twice to generate two multi-segment route sequence subparts. In particular, in a first split, the first multi-segment subpart goes from the original departure to the last transfer and in the second split, the second multi-segment subpart goes from the first transfer to the final destination. These two multi-segment subparts are thus overlapping and each includes at least two segments and has exactly the same number of segments. Each split also includes a single-segment subpart.

At S212, for each of the two multi-segment subparts generated at S210 (that includes more than one boarding), the method proceeds to S200, where the multi-segment subpart is considered as a candidate route sequence. At S214, each single-segment subpart is considered as a candidate trip of the MT journey.

The method proceeds from S212 to S200, where the candidate route sequence is processed to determine if it should be classified as an MT journey or an MS trip, in a similar manner to the route sequences identified at S106.

However, in the case of candidate route sequences, at S216, if more than one of the candidate route sequences identified at S210 complies with the trip planner, the most probable split may be identified at S218, e.g., by using other heuristics to identify the most probable split. In other embodiments, e.g., where no split is more probable than any of the others, the splits may be assigned an equal probability and one of the splits picked at random for each passenger. The method then proceeds to S208, where the origin and destination of the two trips forming the most probable candidate split are identified and stored (or of both candidate splits where each is assigned a respective probability of occurrence).

The partitioning the multi-trip journey into at least two trips can thus be a recursive process which includes progressively partitioning the multi-trip journey to generate exactly two multi-segment subparts, the first multi-segment subpart going from the original departure to the last transfer and the second multi-segment subpart going from the first transfer to the final destination, until only one segment remains or no further multi-trip journeys are identified in the multi-segment subparts.

As an example, in the case of FIG. 1, in the first pass through S210, two candidate splits are generated. In the first split, a first multi-segment route sequence subpart goes from the original departure up to the last transfer (stops A to C) and a first single-segment subpart goes from the last transfer to the final destination (stops C to D). In the second split, a second multi-segment subpart goes from the first transfer to the final destination (stops B to D) and a second single-segment subpart goes from the original departure to the first transfer (stops A to B).

Each of the candidate route sequences (A→C in split 1 and B→D in split 2), is analyzed to determine if it appears as a candidate itinerary 93 in the trip planner for the respective origin and destination. In the illustrative embodiment, this is likely to be the case. However, if there is an alternative route in the trip planner for one or both of the splits, this makes it more probable that the subpart is a multi-trip journey. For example, for the candidate route sequence B→D, if only the trip B→A→D appears as a candidate itinerary 93, then B→C→D is more likely to be a multi-trip journey with a first origin at B and a second origin at C.

As will be appreciated, for longer route sequences, the number of recursive splits at S210 increases linearly.

By performing the process recursively, each of the transfer nodes of the initial travel is considered to be a 'coherent' one. However, during the resolution of the two sub problems, no split may be performed, as it would be the case in FIG. 1, because each sub part of the travel follows a 'coherent' itinerary. In this case, the route sequence may be split arbitrarily at one of the two transfer locations. Alternatively, additional criteria may be used to decide how to arbitrate between the two stops.

This method assumes that the trip planner 92 is able to capture some objective criteria for choosing a route for a given origin and destination. The trip planner 92 may be adapted to the present method by weighting some of the criteria differently. For example, criteria weights may be determined experimentally by questioning travelers about their journeys for a given day and comparing these to the output of the system with a conventional trip planner. The trip planner may then be modified so that the system outputs origins and destinations for route sequences which, in the aggregate, more closely follow the aggregated user behavior. For example, a trip planner 92 may place higher weight on minimizing the trip distance than on the number of transfers for the selection of a route sequence. If the user behavior suggests that more weight should be placed on the number of transfers, the trip planner may be adapted to reflect this. In general, however, if the trip planner 92 is able to use different criteria weights to provide alternative routes, where available, this avoids the need to retrain the trip planner.

As will be appreciated, the identified MS trips 98 and MT journeys 100 and their splits are predictions. There are criteria that individual travelers may use in planning their journeys that are not among the criteria considered, such as more scenic travel, less crowded vehicles, more comfortable vehicles, and so forth, which affect their reasons for selecting trips.

The method illustrated in FIGS. 4 and 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 4 and/or 5, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying passenger trips on a transportation network, comprising:
    acquiring transaction data for a collection of passengers boarding at stops on a transportation network, the transportation network comprising a plurality of routes;
    identifying route sequences based on the transaction data, each route sequence comprising at least two trip segments by a passenger, each pair of trip segments of an identified route sequence being spaced by a transfer;
    for each identified route sequence, using a trip planner, classifying the route sequence as one of:
    a multi-segment trip comprising at least one transfer, and
    a multi-trip journey,
    the trip planner being configured for computing a plurality of itineraries for a journey, given an origin and a destination, each itinerary being based on different weights for a set of criteria,
    where the route sequence is classified as a multi-trip journey, partitioning the multi-trip journey into at least two trips, each of the at least two trips being one of a multi-segment trip and a single-segment trip;
    generating origin-destination data based on the identified multi-segment and single-segment trips; and
    proposing modifications to the transportation network, based on the origin-destination data,
    wherein the identifying of the route sequences, the classifying of the route sequences, and the generating origin-destination data are performed with a processor.

2. The method of claim 1, wherein the generating of origin-destination data comprises generating an origin-destination matrix which for each pair of stops in the transportation network represented in the matrix as an origin and a destination respectively, includes a number of passengers predicted to have made such a trip during a selected time period.

3. The method of claim 1, further comprising outputting the identified multi-segment and single-segment trips or information based thereon.

4. The method of claim 3, wherein the information comprises origin-destination data based on the identified multi-segment and single-segment trips.

5. The method of claim 1, wherein the acquiring transaction data for passengers boarding at vehicle stops on the transportation route comprises acquiring identifiers for electronic tickets used by at least some of the passengers boarding at the vehicle stops.

6. The method of claim 1, wherein identifying route sequences based on the transaction data comprises predicting alighting stops for the passengers, the predicting including applying a set of heuristics.

7. The method of claim 6, wherein the set of heuristics include heuristics selected from the group consisting of:
    assuming that passengers return to their previous trip's destination stop for their next trip, or to the nearest stop on the next route;
    assuming that passengers have, as their final destination of a day, a stop corresponding to their first boarding of the same day or the next day; and
    assuming that passengers using tickets that are not valid for the entire day follow a similar distribution to those using tickets that are valid for the entire day.

8. The method of claim 1, wherein the identifying route sequences includes identifying trip segments that are spaced by a transfer time of up to a threshold transfer time or which, in combination with the transfer time, do not exceed a predefined maximum total time.

9. The method of claim 1, wherein the classifying of the route sequence comprises:
    accessing the trip planner with an origin and a destination of the route sequence;
    when the route sequence is identified by the trip planner as one of a set of itineraries for a journey between the origin and the destination of the route sequence, classifying the route sequence as a multi-segment trip;

when the route sequence is not identified by the trip planner as one of a set of itineraries for a journey between the origin and the destination of the route sequence, classifying the route sequence as a multi-trip journey.

10. The method of claim 9, wherein when the route sequence is classified as a multi-trip journey, partitioning the route sequence into a plurality of subparts, and for subparts comprising more than two trip segments, using the trip planner, classifying the subpart of the route sequence as comprising at least one of:

a multi-segment trip comprising at least one transfer, and a multi-trip journey.

11. The method of claim 1, wherein at least one of the criteria is selected from the group consisting of:

total journey time;
number of transfers;
total walking distance in the journey;
transfer time between segments;
total cost of the journey; and
combinations thereof.

12. The method of claim 1, wherein the partitioning the multi-trip journey into at least two trips comprises recursively partitioning the multi-trip journey exactly two times to generate two multi-segment route sequence subparts, each multi-segment route sequence subpart comprising at least two trip segments, one of the two multi-segment route sequence subparts going from the original departure to the last transfer and the other of the two multi-segment route sequence subparts going from the first transfer to the final destination, until only one segment remains or no further multi-trip journeys are identified in the multi-segment route sequence subparts.

13. The method of claim 1, wherein the acquiring transaction data includes acquiring boarding information for at least 1000 passenger trips made on the transportation network and wherein the identifying route sequences includes inferring alightings from subsequent boarding information for at least some of the passengers.

14. A system for identifying passenger trips on a transportation network, comprising:

a trip planner which generates at least one candidate itinerary for a journey between an origin and a destination;

a route sequence identifier which receives transaction data which includes boarding information for at least 1000 passenger trips made on the transportation network, the transaction data being acquired for a collection of passengers boarding at stops on a transportation network and which identifies route sequences based on the transaction data, each route sequence comprising at least two trip segments by a respective passenger, each pair of trip segments in the route sequence being spaced by a transfer;

a route sequence decomposer which, for an identified route sequence, using the trip planner, classifies the route sequence as one of:

a multi-segment trip comprising at least one transfer, which is among a set of candidate itineraries output by the trip planner for an origin and destination of the route sequence, and a multi-trip journey which is not among the set of candidate itineraries output by the trip planner for the origin and destination of the route sequence, and where the route sequence is classified as a multi-trip journey, partitioning the multi-trip journey into at least two trips, each of the at least two trips being one of a multi-segment trip and a single-segment trip;

generating origin-destination data based on the identified multi-segment and single-segment trips; and proposing modifications to the transportation network, based on the origin-destination data, and a processor which implements the route sequence identifier, the generating origin-destination data, and route sequence decomposer.

15. The system of claim 14, further comprising an origin-destination data generator which generates aggregated origin-destination data based on origins and destinations of the identified multi-segment and single-segment trips.

16. A method for generating origin-destination data for a collection of passenger trips on a transportation network, the method comprising:

acquiring transaction data for a collection of passengers boarding at stops on a transportation network, the transportation network comprising a plurality of routes, the transaction data including boarding information for at least 1000 passenger trips made on the transportation network;

identifying route sequences based on the transaction data, each route sequence comprising at least two trip segments by a passenger and at least one transfer;

for an each identified route sequence:

using a trip planner to identify a set of candidate itineraries between an origin and a destination of the route sequence;

classifying the route sequence as one of:

a multi-segment trip comprising at least one transfer, when the route sequence is among the set of candidate itineraries output by the trip planner between the origin and destination of the route sequence, and a multi-trip journey, when the route sequence is not among the set of candidate itineraries output by the trip planner between the origin and destination of the route sequence, and when the route sequence is classified as a multi-trip journey, partitioning the multi-trip journey into at least two trips, each of the at least two trips being one of a multi-segment trip and a single-segment trip;

generating origin-destination data based on the identified multi-segment and single-segment trips identified based on the transaction data, proposing modifications to the transportation network, based on the origin-destination data, and wherein the identifying of the route sequences, the generating origin-destination data, and the classifying of the route sequences is performed with a processor.

* * * * *